UNITED STATES PATENT OFFICE.

JOHN M. ALLEN, OF NEW BEDFORD, MASSACHUSETTS.

MANUFACTURE OF PAPER FROM BARK.

SPECIFICATION forming part of Letters Patent No. 342,991, dated June 1, 1886.

Application filed December 1, 1883. Serial No. 113,317. (Specimens.)

*To all whom it may concern:*

Be it known that I, JOHN MITCHELL ALLEN, of New Bedford, in the county of Bristol, State of Massachusetts, United States of America, architect, have invented a certain new and useful Improvement in the Art or Process of Manufacturing Paper and the Different Varieties of Paper-Board, Including Leather-Board, so called; and I do hereby declare that the following is a full, clear, and exact description of the same.

My invention relates to the use of the raw or uncooked bark of the "cedars," commonly so called, (scientifically, cypress, juniper, and cedar,) when mixed with other paper-stock or fibrous material, and also to the use of the inner bark of either of the other varieties of the cone-bearing trees, (principally the inner bark of the pine and the spruce,) used raw or uncooked and mixed with other fibrous material or with the cedar bark.

This invention also relates to a combination of cedar bark and other paper-stock (particularly satinets and woolen stock) in paper or felting and saturated with coal-tar or pine-tar.

In carrying out this invention I proceed as follows: I take the bark of the "cedar," commonly so called, as it is brought to the mill, without special previous preparation or separation of the outer from the inner parts, except what might take place from the ordinary handling or transportation of the bark, and then cut or equivalently reduce the bark to fragments, which to get the best results from, especially when the per centage of bark to be used is large, as compared to the other stock with which it is to be mixed, should not be more than two or three inches long, if reduced by cutting, as in this case a succession of large pieces of bark would clog and might even stop the beating-roll, though it is possible to work the bark in greater lengths, especially when it is torn into shreds or picked into pieces, or when the per centage of bark is small as compared with the other stock with which it is to be mixed. In this case the fragments of bark might be even several feet in length, since they would be held down and carried around in the engine by the other stock with which they are entangled. I then furnish these bark fragments directly to the beating-engine of a paper-mill or a paper-pulp mill without the intervention of a treatment by water, for the purpose of removing the extractive matters of the bark, though, if desired, a tank of water at some low temperature might be used for softening and making heavy the bark by soaking it before subjecting it to the treatment in the beating-engines. A better result is always obtained if the fragments of bark are damp rather than dry when they go to the beating-engines, and better yet if the barks have been allowed to stand in water until the mucilaginous substances have softened, and even chemically changed, before the treatment in the beating-engines. The beating-engines should be charged or furnished with water and with the fragments of bark, or the bark fragments, and other paper-stock in about the same proportions that are usually observed in the paper-mills working on ordinary material, which is about one thousand gallons of water for stock that will yield four hundred pounds of paper, and in about that proportion for engines of different sizes when the common Holland engine is used. A skillful engineer's judgment is the best guide in that respect, however. Here the bark fragments are gradually reduced to pulp. The water of the beating-engine meanwhile becomes charged with what soluble and granular matters it can easily take up, (which consist, principally of albuminous and mucilaginous matters, tannin, and hard resin, or about twenty-three per centum of the whole weight of the bark, taken dry,) and makes therewith a kind of liquor, in which the pulp may be worked until it reaches the machine for converting it into paper; or this liquor may be removed by the usual process of washing in the beating-engines. I prefer the former method as being cheaper and more simple, though the action of the revolving washers greatly assist in moving the stock in the beating-engines, particularly in the early stages of the work, the bark being light and inclined to float if unsoaked. Where the proportion of bark is large, if I did not use the washers for washing, I should use them, or some similar contrivance to them, to assist the stock movement by holding the bark down and pushing it around in the engine, unless the bark has previously been well soaked and made heavy thereby, or unless the proportion of bark to the other stock was small, when by its entanglement with the other stock in the engine it would be prevented from floating, and would be carried along by the other stock until itself became fibered out and soaked in the water of the engine, when it would take its proper place and work easily and well with the other stock. Here the weight of the bark by soaking, or the entanglement of it in the other stocks, as above, would take the place of any mechanical contrivance for assisting the stock movement referred to. When the inner barks named above are used, I should feed the pieces in any lengths as they may come to the mill into the beating-engines. In some instances I might desire to cut or soak them, or both, but generally not for this process, at least. During the operation of pulping, as above described, the stock or stocks in the engines may be sized or not, or colored or not, as may be desired. Regarding the time required for the pulping of the stock or stocks, as above described, I will say that for the ordinary grades of paper from three to eight hours are usually sufficient; but if the purpose is to make the finer qualities of paper, or to make the better grades of paper-board, such as the well-known grades of mill-board, trunk-board, leather-board, &c., I should prefer a longer time, especially for the last-named board, in the treatment of which in the beating-engines I have found from twelve to eighteen or sometimes even twenty hours to be none too long. As to the manner of mixing the bark fragments with the other stock or stocks to be used, I should complete supplying the beating-engine with the other fibrous material properly prepared very soon after furnishing the engine with all the bark fragments requisite for the operation, and then let the mixed stock beat out together to a pulp; but this mixture of pulps may be accomplished by a partial beating of the different stocks in different engines and then uniting them in one engine; or they may be beaten out entirely in different engines and mingled afterward in the stuff-chest; or the stock or stocks other than the bark may first be furnished to the engine and the bark put in afterward, and the stocks so mixed beat out together to a pulp. I prefer the first method, when the proportion of bark is large to the other stock, and the last method when the proportion of bark is small, or, say, less than fifty per centum of the whole. The fibers of these barks, particularly those of the cedar-bark, are short, but sufficiently strong when entirely rid of the intercellular matters adhering to and incrusting them to make a very good paper without the admixture of any other fibers; but when incrusted by the substances remaining after the treatment above described they are somewhat prevented from taking a close and interlocking relation among themselves that is requisite for a very good paper as regards strength for the cedar-bark and softness and pliability for the inner barks named, and it becomes necessary where strength or some other particular quality is required that some other paper-stock be mixed with them, or they be mixed together to give the resulting paper or paper-board the requisite qualities for a good marketable article. The cedar-bark by the above treatment is soft and imparts that quality, as well as one of flatness and smoothness, to the resulting paper or paper-board, and from the antiseptic qualities that it retains after the treatment as above and the peculiar odor that attaches to it from the presence of some resin and essential oil it has a particular value in a great variety of papers and paper-boards. Carpet-lining paper or felt containing a large proportion of cedar-bark treated as above is believed to be proof against the attacks of insects and moths from the fact that the cedar-bark in it has been deprived by the cold or tepid water in the beaters of the albuminous or insect food, substances which a hot-water treatment would have coagulated and retained, while by the treatment of the bark by this process the properties of the cedar-bark that are repellent to insect life (the plastic resin and essential oils and some gallo-tannic compounds) are retained unaltered by no high temperatures, or by the action of any chemical substances other than cold or tepid water. The softness of the raw cedar-bark stock further commends it for the carpet linings or felts, and when corrugated this paper is believed to be the best in the market. The antiseptic qualities retained by the barks after this process prevent the decay of the paper or board into which they enter largely by mildew or fermentative action, making them particularly valuable in sheathing-papers and box-linings for this reason, and their perfect smoothness and flatness enhances their value in this way. Indeed, paper or board made by a mixture of the cedar-bark and the inner barks named, or either of them, and where no other stock is employed is almost absolutely proof against fermentative action, and will endure in the most trying circumstances of warmth and dampness, when other papers would soon rot. The quality that the raw cedar-bark has of imparting to the other stocks with which it is mixed the property of drying out flat and smooth, as well as its softness and its clean and perfect action in the mill, give it great value for a stock to be worked into the various kinds of paper-board named above, particularly for the soft grades of leather-board, known as "shaker" or "veneer." For chest or box linings, or the material of which boxes may be made, this raw cedar-bark paper or board has the property, from the peculiar odor it gives off, of preserving woolen or other articles that the boxes may contain. With satinets or woolen stock the cedar-bark by this process works exceedingly well in various proportions for different purposes, but particularly from twenty-five to fifty per centum of cedar-bark with the satinets or woolen stock, which may also be used raw, does this combination succeed as a saturating paper or felt for coal-tar or pine-tar, since the papers or feltings have only to be passed through a bath of hot tar to absorb of it about one hundred and fifty per centum of their weight, making one ton of paper or felting when saturated weigh two and one-half tons or more. For "middlings" or papers that are to be covered or are covered in the process of making by other papers, these barks, or either of them, but particularly the cedar-bark, can be used in varying proportions to ninety per centum of the whole combination. Indeed, the uses are so various that the paper or board made from these barks, or either of them, have, when treated by this process and mixed with other kinds of stock in different proportions, that it is impossible to state exactly what these proportions should be, since they might range, for the bark stocks, all the way up to ninety per centum of the whole. In the language of the paper-mills, the use of these barks as a "filler" or "filling" would probably be most frequent. As I understand these terms they mean the use of a stock in some small proportion, where, from its cheapness or from some desirable quality it imparts to the resulting paper or board, it can be used to advantage, but not to be used to such an extent that the body of the resulting paper shall consist principally of it, though papers made principally of the barks would have very extended and varied uses—as, for instance, the sheathings and the carpet-linings.

A few proportions named will be sufficient to illustrate some of the best particular uses of the barks with the other stocks and with each other, though these particular uses are not by any means the only ones that can be made to advantage with the same stocks. For carpet-linings a good proportion is from fifty to seventy-five per centum of cedar-bark with the other stock of cotton-waste, satinets, or woolen stocks, &c., preferably a soft stock should be used here. For sheathings and box-lining papers from fifty to seventy-five per centum of cedar-bark with other stock of cotton-waste, old papers, the inner barks named, &c., preferably a hard stock should be used here. For the soft-leather-board about thirty per centum of cedar-bark, with other stocks of bagging or cotton, and leather scraps, &c., the inner barks work well up to fifty per centum, or more, in the various kinds of paper-board, including the harder kinds of leather-board. As a filler or filling these barks work well in lining-papers of many kinds, wrapping-papers of many kinds, and paper-board of all kinds. The intercellular matters remaining attached to and incrusting the fibers that I desire to retain after the treatment by this process are nearly or quite as much in amount as those expelled in the beaters, and in the cedar-bark lie mainly in the outer parts. The inner parts of these barks mostly contain the albuminous and mucilaginous matters that are removed in the beating-engines. These combined pulps may be bleached by the usual methods or not, as may be desired, and may receive clay or other unfibrous filling in the beating-engines, or not, as may be desired, and when the pulping is completed, as above, they may be run into paper or paper-board in the usual manner. These barks should not be subjected to a greater heat than from 160° to 190° Fahrenheit in the early stages of the treatment, or before the albuminous and mucilaginous matters are expelled from the fibers in the beating-engines, nor at any time to heat above the boiling-point. When the intercellular matters have not been materially affected by heat, I speak of the barks as raw. When a high degree of heat has been applied in the early stages of the process, the resulting paper presents a lustrous appearance from the albuminous matters incasing the fibers and lying between them having coagulated, and other changes take place. Bark treated at low temperatures shows in the paper as a lusterless color, and retains the natural odors of the bark, which may be brought out by warming the paper slightly, and in other ways these papers and boards containing these barks treated by this process would be distinguishable by experts from paper or board made from other stocks, or from the paper or boards made from the barks by other processes.

Having thus described my invention, what I claim as new therein is—

1. The herein-described process of making paper-pulp from the bark of cedars and similar conifers, which process consists in tearing or shredding or cutting into small pieces the bark, then submitting it to the beaters charged with water at a low temperature, so as to remove the mucilaginous and albuminoid substances, but retain the tannate, and then pulping the stock so made, substantially as specified.

2. A paper-pulp prepared as herein described, consisting of a stock made from the bark of cedar and similar conifers and having the mucilaginous and albuminoid substances removed, but retaining the tannate, substantially as specified.

3. A paper-pulp prepared as herein described, consisting of a stock made from the bark of cedars and similar conifers having the mucilaginous and albuminoid substances removed but retaining the tannate, mixed with other paper-stocks, substantially as described.

In testimony whereof I affix my signature in presence of two witnesses.

JOHN M. ALLEN.

Witnesses:
HELEN W. WEBSTER,
NINA M. SUMNER.